(12) United States Patent
Ma et al.

(10) Patent No.: US 11,702,277 B2
(45) Date of Patent: Jul. 18, 2023

(54) FULLY SOIL-COVERED STRUCTURE OF VERTICAL TANK BODY

(71) Applicants: SHANDONG CHAMBROAD HOLDING GROUP CO., LTD., Binzhou (CN); SHANDONG CHAMBROAD EQUIPMENT MANUFACTURE INSTALLATION CO., LTD., Binzhou (CN)

(72) Inventors: Yunsheng Ma, Binzhou (CN); Liqiu Zhao, Binzhou (CN); Chenghe Zhang, Binzhou (CN); Shiheng Ma, Binzhou (CN); Bo Yan, Binzhou (CN); Qingsong Zhao, Binzhou (CN); Chongchong Zhang, Binzhou (CN)

(73) Assignee: SHANDONG CHAMBROAD EQUIPMENT MANUFACTURE INSTALLATION CO., LTD., Binzhou (CN)

( * ) Notice: Subject to any disclaimer, the term of this patent is extended or adjusted under 35 U.S.C. 154(b) by 0 days.

(21) Appl. No.: 17/998,288

(22) PCT Filed: Apr. 12, 2021

(86) PCT No.: PCT/CN2021/086668
§ 371 (c)(1),
(2) Date: Nov. 9, 2022

(87) PCT Pub. No.: WO2022/193385
PCT Pub. Date: Sep. 22, 2022

(65) Prior Publication Data
US 2023/0134488 A1    May 4, 2023

(30) Foreign Application Priority Data

Mar. 16, 2021   (CN) .......................... 202110280214.9

(51) Int. Cl.
*B65D 88/76* (2006.01)
*E02D 27/38* (2006.01)
*B65D 90/22* (2006.01)

(52) U.S. Cl.
CPC ............ *B65D 88/76* (2013.01); *E02D 27/38* (2013.01); *B65D 90/22* (2013.01)

(58) Field of Classification Search
CPC .......... B65D 88/76; B65D 90/22; E02D 27/38
See application file for complete search history.

(56) References Cited

U.S. PATENT DOCUMENTS 4,425,743 A * 1/1984 Bartur .................... B65D 88/76
                                                     52/169.1

FOREIGN PATENT DOCUMENTS

CN    204940310 U    1/2016
CN    107035965 A    8/2017
(Continued)

OTHER PUBLICATIONS

PCT/CN2021/086668—International Search Report, dated Nov. 2, 2021, 3 pages.
(Continued)

*Primary Examiner* — Frederick L Lagman
(74) *Attorney, Agent, or Firm* — Getech Law LLC; Jun Ye

(57) ABSTRACT

A soil completely-covered structure includes a base layer, slope body filling soil and a buffering layer; the base layer is arranged around a vertical tank body and is made of a base material located on a ground floor, and a first filling gap is formed between the base layer and an outer wall of the vertical tank body; the slope body filling soil is arranged on the base layer, a second filling gap is formed between the side of the slope body filling soil and the outer wall of the vertical tank body, and a side slope surface is formed on the outer side of the slope body filling soil; and the buffering layer is formed in the first filling gap and the second filling gap, and the buffering material fills the first filling gap and the second filling gap to wrap the surface of the vertical tank body.

11 Claims, 3 Drawing Sheets

(56) References Cited

FOREIGN PATENT DOCUMENTS

| | | | | |
|---|---|---|---|---|
| CN | 107246025 A | * | 10/2017 | ............. E02D 19/20 |
| CN | 107401677 A | | 11/2017 | |
| CN | 206800461 U | | 12/2017 | |
| CN | 108978701 A | | 12/2018 | |
| CN | 212200279 U | | 12/2020 | |
| CN | 112482185 A | | 3/2021 | |
| CN | 114636097 A | * | 6/2022 | |
| JP | H04312294 A | | 11/1992 | |
| JP | 2005082976 A | | 3/2005 | |
| JP | 2010052740 A | | 3/2010 | |

OTHER PUBLICATIONS 202110280214.9—First Office Action, dated Aug. 4, 2021, 16 pages. (with English translation).
202110280214.9—Notice of Allowance, dated Sep. 8, 2021, 7 pages. (with English translation).

* cited by examiner

FULLY SOIL-COVERED STRUCTURE OF VERTICAL TANK BODY

CROSS REFERENCE OF RELATED APPLICATIONS

This is a 371 of International Application No. PCT/CN2021/086668, filed Apr. 12, 2021 which claims priority from Chinese Patent Application No. 202110280214.9, filed on Mar. 16, 2021, the contents of the aforementioned applications are herein incorporated by reference in their entireties.

FIELD

The present disclosure relates to a field of soil-covered tanks, in particular to a fully soil-covered structure of a vertical tank body.

BACKGROUND

Soil covering storage means that a liquefied petroleum gas at a normal temperature is pressurized and stored in tanks or under the ground and is subjected to reasonable comprehensive backfill, this technology is very suitable for storing a flammable and explosive liquid material and can be used for protecting tank bodies, preventing heat and shock waves generated by combustion and explosion from affecting other tank bodies, effectively reducing risks and ensuring that the tank bodies are mounted closer to one another, thereby saving the land. At present, a technology for a tank body of a fully-vertical tank has not been mature; at abroad, mainly adopted is a half-layer soil covering technology by which the upper layer of the tank body is covered with soil and the bottom of the tank body is provided with a supporting member; however, in view of safety, the advantages of complete covering of soil are apparently more, but a side slope formed around after the complete covering of soil is greater, and a stress condition of the overall soil-covered structure is more complex; moreover, the anti-explosion performance of the overall soil-covered structure needs to be considered emphatically, it is possible that the poor integrity and stability of the soil-covered structure are not embodied when the tank body is static, however, when the tank body explodes by accident, the soil-covered structure which is not stable enough is incapable of playing a deserved role in buffering explosion, and particularly, the soil-covered structure is very easy to collapse when a situation of secondary or more complex explosion occurs. In addition, the tank body in the field is generally greater in volume, the amount of soil for the soil-covered structure is very large, there is a complex soil pressure change inside the formed soil-covered structure, and there are no good measures in the prior art to solve such actual problems, which causes the problems such as damage and deflection easily occurring due to stress on the tank body in the soil-covered structure. How to design to guarantee the stability of a soil completely-covered side slope structure, avoid problems occurring on the tank body inside a soil completely-covered side slope, and meanwhile, avoid problems such as fracture, collapse and sedimentation of the soil completely-covered side slope structure itself has to be settled urgently.

SUMMARY

The present disclosure provides a fully soil-covered structure of a vertical tank body, in which brand-new design and optimization are performed on a soil-covered structure surrounding the vertical tank body, the integrity and stability of the overall soil-covered structure are enhanced by organic combination among a base layer, a slope body filling soil and a buffering layer, the deserved anti-explosion effect on the vertical tank body can be guaranteed, meanwhile, a stress load of the overall soil-covered structure on the vertical tank body can be effectively reduced, deflection and damage of the vertical tank body under a static stress can be eliminated, and thus, the above-mentioned technical problems are solved.

A technical solution adopted for solving the above-mentioned technical problems in the present disclosure is that:

a fully soil-covered structure of a vertical tank body is arranged outside the vertical tank body. The fully soil-covered structure includes:

a base layer, the base layer being arranged at a peripheral side of the vertical tank body and including a base material located on a ground floor, and a first filling gap being formed between a side, close to the vertical tank body, of the base layer and an outer wall of the vertical tank body; and a slope body filling soil, the slope body filling soil being arranged on the base layer, a second filling gap being formed between an inner side, close to the vertical tank body, of the slope body filling soil and the outer wall of the vertical tank body, and a side slope surface being formed on the outer side of the slope body filling soil; and a buffering layer, the buffering layer being formed in the first filling gap and the second filling gap, a buffering material filling the first filling gap and the second filling gap to wrap an outer surface of the vertical tank body, and the buffering layer having higher energy absorption efficiency than the slope body filling soil and being used for buffering a stress change between the vertical tank body and the slope body filling soil.

The base layer is located on a ground floor and is used as a bottom support of the soil completely-covered structure; the slope body filling soil is arranged on the base layer; the buffering layer is arranged between each of the base layer and the slope body filling soil and the outer surface of the vertical tank body, and the buffering layer has dual effects: firstly, an anti-explosion requirement is met: when the vertical tank body explodes, the buffering layer is capable of absorbing shock energy caused by explosion to the maximum extent at the first time, thereby playing a role in buffering shock waves and taking safe and anti-explosion effects; and secondly, a static stress is buffered and absorbed: when the vertical tank body is static under a normal working condition, the buffering layer is utilized to buffer and counteract the pressure of the external slope body filling soil to the tank body, so that the pressure from the soil-covered structure to the vertical tank body can be reduced as much as possible, and the vertical tank body is protected. For example, the surface of the vertical tank body may be provided with an anti-corrosion coating for anti-corrosion treatment; and due to the arrangement of the anti-corrosion coating, the effect of protecting the vertical tank body can be achieved, and corrosion on the surface of the vertical tank body after the buffering layer is damaged can be avoided. In addition, the fully soil-covered structure consisting of the base layer, the slope body filling soil and the buffering layer is combined with and supported by each other so as to be better in integrity and stability. Due to the existence of the buffering layer, the motion tendency of the slope body filling soil can also be buffered, so that the overall soil-covered structure has higher "elasticity". When the stress change occurs on the slope body filling soil, the stress can directly act on the vertical tank body if there is no buffering layer, the problems such as fracture and sedimentation of the slope body filling soil can easily occur due to accumulation within a long time if there is no buffering layer, and such a technical defect is just overcome by the design of the buffering layer.

In a preferred implementation, the base material has a first compaction coefficient, the slope body filling soil has a second compaction coefficient, the buffering material a third compaction coefficient, and the first compaction coefficient is greater than the second compaction coefficient, and the second compaction coefficient is greater than the third compaction coefficient.

The base layer is located at the bottom of the vertical tank body and needs to play a role in supporting the vertical tank body, and therefore, a greater compaction coefficient is required to ensure its supporting strength. The buffering layer is in direct contact with the surface of the vertical tank body, and the vertical tank body is isolated from the slope body filling soil, so that the surface of the vertical tank body is prevented from being damaged due to abrasion and collision in a process that the slope body filling soil is compacted. In order to achieve a better buffering effect, the buffering layer is required to be looser, but cannot be too compact, and therefore, a smaller compaction coefficient is required. The slope body filling soil surrounds the vertical tank body, and the vertical tank body needs to be surrounded, so that support and protection are provided for the vertical tank body. The slope body filling soil itself needs to have a certain supporting capacity, the stability of the overall soil-covered structure is taken into account, and therefore, the compaction coefficient of the slope body filling soil is between the compaction coefficient of the base material and the compaction coefficient of the buffering material.

In a preferred implementation, the base material of the base layer has a first particle size, the slope body filling soil has a second particle size, the buffering material of the buffering layer has a third particle size, and the first particle size is greater than the second particle size, and the second particle size is greater than the third particle size.

The base layer is located at the bottom of the vertical tank body and needs to play a role in supporting the vertical tank body, and therefore, a filler of which the particle size is greater is suitable for being selected to ensure its supporting strength. The buffering layer is in direct contact with the surface of the vertical tank body, and the vertical tank body is isolated from the slope body filling soil, so that the vertical tank body is prevented from being damaged due to abrasion and collision in a process that the slope body filling soil is compacted, and therefore, a smaller particle size needs to be selected for the buffering layer. The slope body filling soil surrounds the vertical tank body, and the vertical tank body needs to be surrounded, so that support and protection are provided for the vertical tank body. The slope body filling soil not only needs to have a certain supporting capacity, but also needs to have a certain protection effect, and therefore, the particle size of the slope body filling soil is between the particle size of the base layer and the particle size of the filler in the buffering layer.

In a preferred implementation, the first compaction coefficient is not smaller than 0.96, the second compaction coefficient is not smaller than 0.94, and the third compaction coefficient is not smaller than 0.9. The compaction coefficients of the base layer, the slope body filling soil and the buffering layer are specifically matched according to actual materials, and different compaction coefficients may appear due to the adoption of different materials in different areas.

In a preferred implementation, the base layer is set to be graded broken stone, and the buffering layer is set to be silty-fine sand.

The base layer adopts the graded broken stone which is good in drainage performance, so that water in covering soil can be discharged in time, but cannot be accumulated at the bottom of a slope body; and the silty-fine sand is small in particle size so as to be incapable of damaging the tank body when being used as the buffering layer to be in contact with the tank body.

In a preferred implementation, a minimum thickness of the buffering layer is not smaller than 0.5 m. In order to enable the buffering layer to play a basic anti-explosion buffering role, the minimum thickness of the buffering layer is limited, meanwhile, its actual thickness is comprehensively designed and considered according to factors such as the size of the vertical tank body as well as the materials and compaction coefficients of the base material and the slope body filling soil, an excessively-thick buffering layer may affect the strength and stability of the overall soil-covered structure, and an excessively-thin buffering layer cannot meet deserved buffering and anti-explosion requirements.

If the thickness of the buffering layer is excessively small, once the buffering layer is squeezed, it becomes compact immediately, thereby quickly losing its buffering effect. Therefore, the thickness of the buffering layer is set to be not smaller than 0.5 m, the buffering layer has a thickness large enough, and there is a motion gap large enough among particles of a buffering material, and then, a corresponding buffering effect is achieved.

In a preferred implementation, a size of the second filling gap in the radial direction of the vertical tank body is set to be gradually increased from bottom to top, so that an inverted circular truncated cone form is formed on the outer surface of the buffering layer corresponding to the second filling gap. The structure of the buffering layer is set to be in the form in this implementation, thereby improving the buffering capacity and effect of the buffering layer, guaranteeing better balance between the slope body filling soil and the buffering layer, being beneficial to the stability of the overall soil-covered structure and also achieving a better protection effect on the tank body. After materials are stored in the vertical tank body, the center of gravity of the vertical tank body is focused at the bottom, the position closer to the bottom of the vertical tank body is not easily affected by an external pressure, the position closer to the top of the vertical tank body is easily affected by the pressure of the soil-covered structure, therefore, the thickness of the buffering layer closer to the upper part is greater, and the buffering capacity at the upper part is also improved correspondingly. Such a problem is solved pointedly, so that the vertical tank body is better protected from being affected by the pressure. For the base layer and the slope body filling soil, the buffering layer has a certain "flow tendency", the buffering layer itself cannot become a relatively fixed stable earthwork structure alone, but can apply an accumulation load to the vertical tank body, thereby adjusting an appropriate outer dip angle to form an inverted circular truncated cone shape; and then, the accumulation load can be eliminated by utilizing the slope body filling soil, so that the slope body filling soil on the base layer and the buffering layer interact to be more stable, and sufficient compaction can be supported.

In a preferred implementation, an inner wall of the base layer corresponding to the first filling gap and an inner wall of the slope body filling soil are arranged to be extendable correspondingly, so that the first filling gap and the second filling gap correspond to each other, and the buffering layer in the inverted circular truncated cone form formed in the second filling gap is extendable to the first filling gap.

It is further explained that a side slope surface formed on the outer side of the slope body filling soil enables the overall slope body filling soil to have a first pressure facing the buffering layer and the buffering layer in the inverted circular truncated cone form forms a downward second pressure, the second pressure is lower than the first pressure, and the second pressure is used for counteracting part of the first pressure acting on the vertical tank body.

In a preferred implementation, an outer surface of the buffering layer in the inverted circular truncated cone form is provided with a generatrix, and an included angle of the generatrix relative to the vertical direction is not greater than 30°. In view of the difficulty of a formation process for the buffering layer during actual construction and the proportion of the overall soil-covered structure, after simulated calculation and field test, the included angle of the generatrix relative to the vertical direction is set as 30° or below, the buffering of the buffering layer and the supporting of the slope body filling soil are taken into account, and thus, the overall soil-covered structure is balanced to be stable.

In a preferred implementation, the soil-covered structure of the vertical tank body further includes a protection slope arranged on the side slope surface, and the bottom of the protection slope is connected to the base layer to strength the slope body filling soil.

After soil covering around the vertical tank body is ended, the protection slope may be arranged for reinforcement treatment on the surface of a slope body to prevent the phenomenon that the protection effect of the slope body on the tank body is affected by slope body damage caused by slip of the slope body under the situations such as rainwash or high wind and sedimentation suffered by the slope body in the future. The protection slope is arranged on the surface of the slope body, and the bottom of the protection slope is connected to the base layer, so that a role in fixing the protection slope can be played.

In a preferred implementation, the protection slope includes arched frameworks and a grass planting protection slope, a plurality of arched frameworks are arranged uniformly at interval along the side slope surface, and the grass planting protection slope is arranged on other parts of the side slope surface uncovered by the arched frameworks.

The protection slope is in a form that the arched frameworks are combined with grass planting; firstly, the arched frameworks are utilized to form a fixed frame on the side slope surface, a side slope is accommodated in the arched frameworks on a large area, and thus, a role in integrating the protection slope is played; and secondly, the grass planting protection slope is arranged on other parts of the side slope surface uncovered by the arched frameworks, in this way, blanks in the arched frameworks can be filled completely, and thus, the integral and stable protection slope is formed.

In a preferred implementation, a slope top is formed on tops of the buffering layer and the slope body filling soil, and a waterproofing and reinforcing layer is arranged on the slope top.

There is the protection slope for protecting the slope body filling soil surrounding the tank body. However, if there is no protection structure on the slope top, the overall slope body will be affected, and therefore, the top of the slope body is provided with the waterproofing and reinforcing layer by which rainwater permeation from top to bottom can be effectively avoided, and the protection slope and the waterproofing and reinforcing layer of the slope top are combined to form a more integral and comprehensive slope body protection cover.

In a preferred implementation, the waterproofing and reinforcing layer includes a square brick slope surface and an impermeable membrane, the impermeable membrane is arranged on the slope top, the square brick slope surface is arranged outside the impermeable membrane, and the side, close to the vertical tank body, of the square brick slope surface is relatively high, so that the square brick slope surface is arranged obliquely towards the side slope surface from the vertical tank body.

Firstly, the slope top is provided with the impermeable membrane by which rainwater permeation can be avoided; and the square brick slope surface is further arranged outside the impermeable membrane, the square brick slope surface can shield a part of rainwater, and the square brick slope surface is arranged obliquely towards the side slope surface from the vertical tank body so as to be good in drainage effect. Secondly, the square brick slope surface can also provide protection for the impermeable membrane, thereby delaying the shortening, caused by sunshine and wind, of service life of the impermeable membrane.

By adopting the above-mentioned structure, the present disclosure has the beneficial effects that brand-new design and optimization are performed on the soil-covered structure surrounding the vertical tank body, the integrity and stability of the overall soil-covered structure are enhanced by organic combination among the base layer, the slope body filling soil and the buffering layer, the deserved anti-explosion effect on the vertical tank body can be guaranteed, meanwhile, a stress load of the overall soil-covered structure on the vertical tank body can be effectively reduced, and deflection and damage of the vertical tank body under a static stress can be eliminated.

BRIEF DESCRIPTION OF THE DRAWINGS

The accompanying drawings described herein are provided for further understanding of the present disclosure, and constitute one part of the present disclosure. Exemplary embodiments of the present disclosure and their descriptions are intended to explain the present disclosure, rather than to constitute improper limitations on the present disclosure. In the accompanying drawings.

Figure 1:
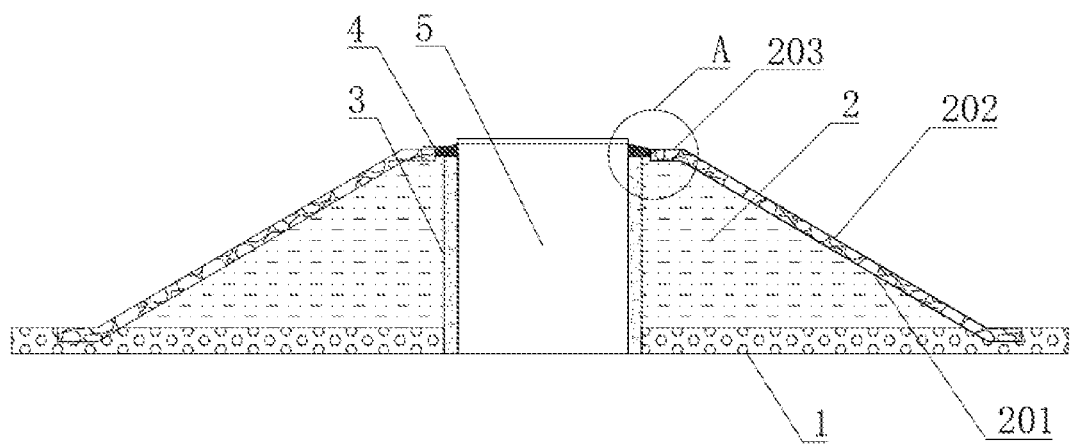
FIG. 1 is a schematic view of a sectional-view structure in an implementation of the present disclosure.
Figure 2:
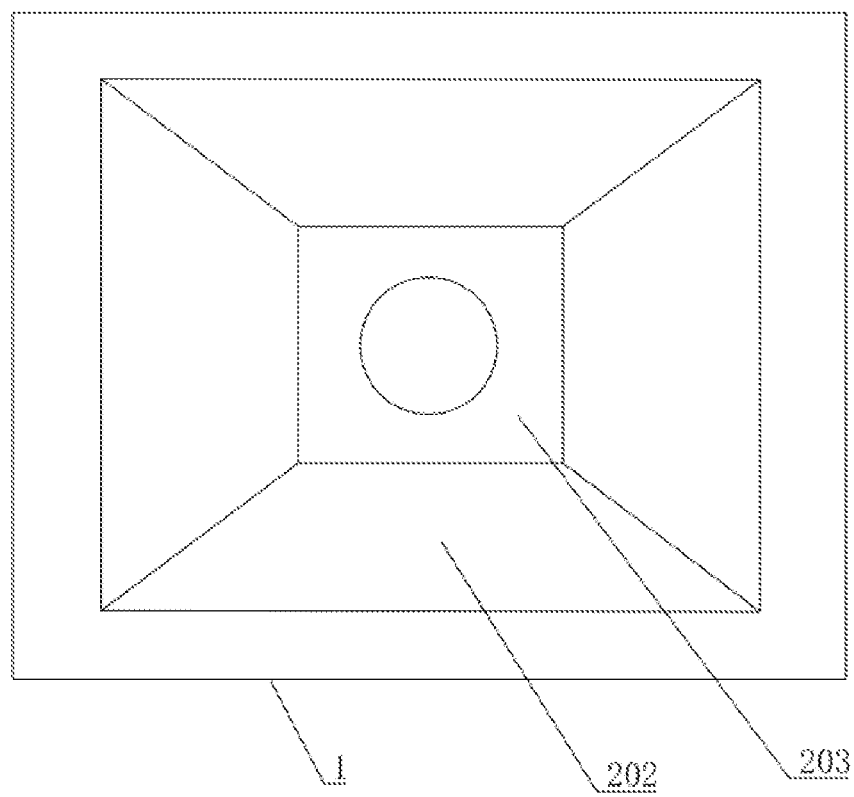
FIG. 2 is a schematic view of a vertical-view structure in an implementation of the present disclosure.
Figure 3:
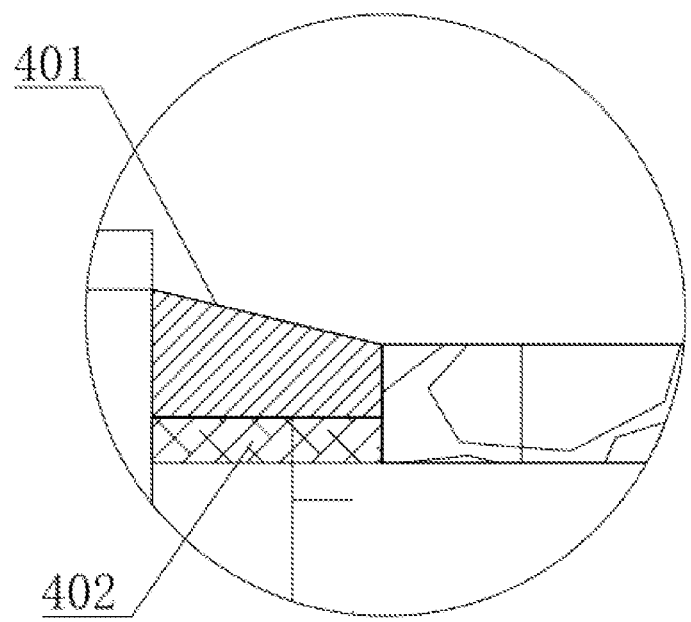
FIG. 3 is a partial enlarged view of part A in FIG. 1.

In the drawings:
1, base layer;
2, slope body filling soil; 201, side slope surface; 202, protection slope; 203, slope top;
3, buffering layer;
4, waterproofing and reinforcing layer; 401, square brick slope surface; 402, impermeable membrane;
5, vertical tank body;
6, first filling gap;
7, second filling gap; and
8, generatrix.

DETAILED DESCRIPTION OF THE EMBODIMENTS

In order to describe the overall concept of the present disclosure more clearly, detailed descriptions will be further shown below with reference to the accompanying drawings of the description by way of examples.

It needs to be noted that many concrete details are shown in the following descriptions to facilitate the sufficient understanding of the present disclosure, however, the present disclosure can also be implemented in other ways different from the ways described herein, and therefore, the protection scope of the present disclosure is not limited by the specific embodiments disclosed below.

As shown in FIG. 1 to FIG. 5, a fully soil-covered structure of a vertical tank body is arranged outside the vertical tank body 5. The fully soil-covered structure includes: a base layer 1, a slope body filling soil 2 and a buffering layer 3, the base layer 1 is arranged at a peripheral side of the vertical tank body 5 and includes a base material located on a ground floor, and a first filling gap 6 is formed between a side, close to the vertical tank body, of the base layer 1 and an outer wall of the vertical tank body 5; the slope body filling soil 2 is arranged on the base layer 1, a second filling gap 7 is formed between an inner side, close to the vertical tank body 5, of the slope body filling soil 2 and the outer wall of the vertical tank body 5, and a side slope surface 201 is formed on the outer side of the slope body filling soil 2; and the buffering layer is formed in the first filling gap 6 and the second filling gap 7, a buffering material fills the first filling gap 6 and the second filling gap 7 to wrap an outer surface of the vertical tank body 5, the buffering layer 3 has higher energy absorption efficiency than the slope body filling soil 2 and is used for buffering a stress change between the vertical tank body 5 and the slope body filling soil 2.

The base layer 1 is located on the ground floor and is used as a bottom support of the overall soil-covered structure; the slope body filling soil 2 is arranged on the base layer 1; the buffering layer 3 is arranged between each of the base layer 1 and the slope body filling soil 2 and the outer surface of the vertical tank body 5, and the buffering layer 3 has dual effects: firstly, an anti-explosion requirement is met: when the vertical tank body 5 explodes, the buffering layer 3 is capable of absorbing shock energy caused by explosion to the maximum extent at the first time, thereby playing a role in buffering shock waves and taking safe and anti-explosion effects; and secondly, a static stress is buffered and absorbed: when the vertical tank body 5 is static under a normal working condition, the buffering layer 3 is utilized to buffer and counteract the pressure of the external slope body filling soil 2 to the vertical tank body 5, so that the pressure from the soil-covered structure to the vertical tank body 5 can be reduced as much as possible, and the vertical tank body 5 is protected. For example, the surface of the vertical tank body 5 may be provided with an anti-corrosion coating for anti-corrosion treatment; and due to the arrangement of the buffering layer, the effect of protecting the buffering layer can be achieved, and corrosion on the surface of the vertical tank body after the buffering layer is damaged can be avoided. In addition, the fully soil-covered structure consisting of the base layer 1, the slope body filling soil 2 and the buffering layer 3 is combined with and supported by each other so as to be better in integrity and stability. Due to the existence of the buffering layer 3, the motion tendency of the slope body filling soil 2 can also be buffered, so that the overall soil-covered structure has higher "elasticity". When the stress change occurs on the slope body filling soil 2, the stress can directly act on the vertical tank body 5 if there is no buffering layer 3, the problems such as fracture and sedimentation of the slope body filling soil can easily occur due to accumulation within a long time if there is no buffering layer 3, and such a technical defect is just overcome by the design of the buffering layer 3.

Further, the base material of the base layer 1 has a first compaction coefficient, the slope body filling soil 2 has a second compaction coefficient, the buffering material of the buffering layer 3 has a third compaction coefficient, and the first compaction coefficient is greater than the second compaction coefficient, and the second compaction coefficient is greater than the third compaction coefficient.

The base layer 1 is located at the bottom of the vertical tank body 5 and needs to play a role in supporting the vertical tank body 5, and therefore, a greater compaction coefficient is required to ensure its supporting strength. The buffering layer 3 is in direct contact with the surface of the vertical tank body 5, and the vertical tank body 5 is isolated from the slope body filling soil 2, so that the vertical tank body 5 is prevented from being damaged due to abrasion and collision in a process that the slope body filling soil 2 is compacted. In order to achieve a better buffering effect, the buffering layer 3 is required to be looser, but cannot be too compact, and therefore, a smaller compaction coefficient is required. The slope body filling soil 2 surrounds the vertical tank body 5, and the vertical tank body 5 needs to be surrounded, so that support and protection are provided for the vertical tank body 5. The slope body filling soil 2 not only needs to have a certain supporting capacity, but also needs to have a certain protection effect, and therefore, the compaction coefficient of the slope body filling soil 2 is between the compaction coefficient of the base layer 1 and the compaction coefficient of the buffering layer 3.

Further, the base material of the base layer 1 has a first particle size, the slope body filling soil 2 has a second particle size, the buffering material of the buffering layer 3 has a third particle size, and the first particle size is greater than the second particle size, and the second particle size is greater than the third particle size.

The base layer 1 is located at the bottom of the vertical tank body 5 and needs to play a role in supporting the vertical tank body 5, and therefore, a filler of which the particle size is greater is suitable for being selected to ensure its supporting strength. The buffering layer 3 is in direct contact with the surface of the vertical tank body 5, and the vertical tank body 5 is isolated from the slope body filling soil 2, so that the vertical tank body 5 is prevented from being damaged due to abrasion and collision in a process that the slope body filling soil 2 is compacted, and therefore, a smaller particle size needs to be selected for the buffering layer 3. The slope body filling soil 2 surrounds the vertical tank body 5, and the vertical tank body 5 needs to be surrounded, so that support and protection are provided for the vertical tank body 5. The slope body filling soil 2 not only needs to have a certain supporting capacity, but also needs to have a certain protection effect, and therefore, the particle size of the slope body filling soil 2 is between the particle size of the base layer 1 and the particle size of the filler in the buffering layer 3.

Further, the base layer 1 is set to be graded broken stone, and the buffering layer 3 is set to be silty-fine sand.

Further, a minimum thickness of the buffering layer 3 is not smaller than 0.5 m. In order to enable the buffering layer 3 to play a basic anti-explosion buffering role, the minimum thickness of the buffering layer 3 is limited, meanwhile, its actual thickness is comprehensively designed and considered according to factors such as the size of the vertical tank body as well as the materials and compaction coefficients of the base material and the slope body filling soil, an excessively-thick buffering layer 3 may affect the strength and stability of the overall soil-covered structure, and an excessively-thin buffering layer 3 cannot meet deserved buffering and anti-explosion requirements. If the thickness of the buffering layer 3 is excessively small, once the buffering layer 3 is squeezed, it becomes compact immediately, thereby quickly losing its buffering effect. Therefore, the thickness of the buffering layer 3 is not smaller than 0.5 m.

The base layer 1 adopts the graded broken stone which is good in drainage performance, so that water in covering soil can be discharged in time, but cannot be accumulated at the bottom of a slope body; and the silty-fine sand is small in particle size so as to be incapable of damaging the tank body when being used as the buffering layer 3 to be in contact with the tank body.

Further, the first compaction coefficient is not smaller than 0.96, the second compaction coefficient is not smaller than 0.94, and the third compaction coefficient is not smaller than 0.9.

Figure 4:
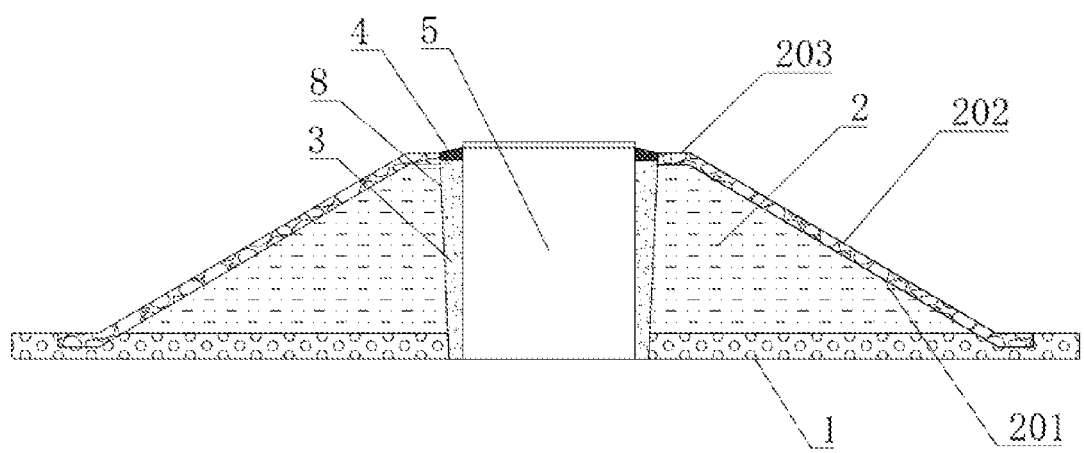
FIG. 4 is a schematic view of another sectional-view structure in another implementation of the present disclosure.
Figure 5:
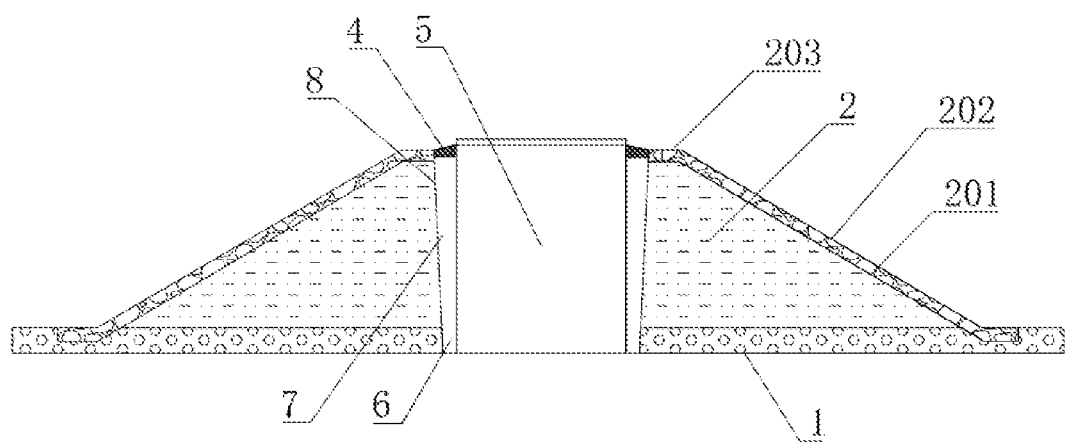
FIG. 5 is a schematic view of a sectional-view structure in which a buffering layer is unshown in an implementation of the present disclosure.

In a preferred implementation, as shown in FIG. 4, a size of the second filling gap 7 in the radial direction of the vertical tank body 5 is set to be gradually increased from bottom to top, so that an inverted circular truncated cone form is formed on the outer surface of the buffering layer 3 corresponding to the second filling gap 7. The structure of the buffering layer 3 is set to be in the form in this implementation, thereby improving the buffering capacity and effect of the buffering layer 3, guaranteeing better balance between the slope body filling soil 2 and the buffering layer 3, being beneficial to the stability of the overall soil-covered structure and also achieving a better protection effect on the vertical tank body 5. After materials are stored in the vertical tank body 5, the center of gravity of the vertical tank body 5 is focused at the bottom, the position closer to the bottom of the vertical tank body 5 is not easily affected by an external pressure, the position closer to the top of the vertical tank body 5 is easily affected by the pressure of the soil-covered structure, therefore, the thickness of the buffering layer 3 closer to the upper part is greater, and the buffering capacity at the upper part is also improved correspondingly. Such a problem is solved pointedly, so that the vertical tank body 5 is better protected from being affected by the pressure. For the base layer 1 and the slope body filling soil 2, the buffering layer 3 has a certain "flow tendency", the buffering layer 3 itself cannot become a relatively fixed stable earthwork structure alone, but can apply an accumulation load to the vertical tank body 5, thereby adjusting an appropriate outer dip angle to form an inverted circular truncated cone shape; and then, the accumulation load can be eliminated by utilizing the slope body filling soil 2, so that the slope body filling soil 2 on the base layer 1 and the buffering layer 3 interact to be more stable, and sufficient compaction can be supported.

In a preferred implementation, an inner wall of the base layer 1 corresponding to the first filling gap 6 and an inner wall of the slope body filling soil 2 are arranged to be extendable correspondingly, so that the first filling gap 6 and the second filling gap 7 correspond to each other, and the buffering layer in the inverted circular truncated cone form formed in the second filling gap 7 is extendable to the first filling gap 6.

It is further explained that a side slope surface formed on the outer side of the slope body filling soil 2 enables the overall slope body filling soil 2 to have a first pressure facing the buffering layer 3 and the buffering layer 3 in the inverted circular truncated cone form forms a downward second pressure, the second pressure is lower than the first pressure, and the second pressure is used for counteracting part of the first pressure acting on the vertical tank body. The thickness of the buffering layer 3 closer to the upper part is greater, the second pressure generated by the buffering layer 3 is higher, and therefore, the buffering layer 3 closer to the upper part can counteract more first pressure from the slope body filling soil 2 and achieve a better buffering effect.

In a preferred implementation, an outer surface of the buffering layer 3 in the inverted circular truncated cone form is provided with a generatrix 8, and an included angle of the generatrix 8 relative to the vertical direction is not greater than 30°. In view of the difficulty of a formation process for the buffering layer 3 during actual construction and the proportion of the overall soil-covered structure, after simulated calculation and field test, the included angle of the generatrix 8 relative to the vertical direction is set as 30° or below, the buffering of the buffering layer 3 and the supporting of the slope body filling soil 2 are taken into account, and thus, the overall soil-covered structure is balanced to be stable.

Further, the soil-covered structure of the vertical tank body further includes a protection slope 202 arranged on the side slope surface 201, and the bottom of the protection slope 202 is connected to the base layer 1 to strength the slope body filling soil 2.

After soil covering around the vertical tank body 5 is ended, the protection slope 202 may be arranged for reinforcement treatment on the surface of a slope body to prevent the phenomenon that the protection effect of the slope body on the tank body is affected by slope body damage caused by slip of the slope body under the situations such as rainwash or high wind and sedimentation suffered by the slope body in the future. The protection slope 202 is arranged on the surface of the slope body, and the bottom of the protection slope 202 is connected to the base layer 1, so that a role in fixing the protection slope 202 can be played.

Further, the protection slope 202 includes arched frameworks and a grass planting protection slope a plurality of arched frameworks are arranged uniformly at interval along the side slope surface 201, and the grass planting protection slope 202 is arranged on other parts of the side slope surface 201 uncovered by the arched frameworks.

The protection slope 202 is in a form that the arched frameworks are combined with grass planting; firstly, the arched frameworks are utilized to form a fixed frame on the side slope surface, a side slope is accommodated in the arched frameworks on a large area, and thus, a role in integrating the protection slope 202 is played; and secondly, the grass planting protection slope 202 is arranged on other parts of the side slope surface 201 uncovered by the arched frameworks, in this way, blanks in the arched frameworks can be filled completely, and thus, the integral and stable protection slope 202 is formed.

Further, a slope top 203 is formed on tops of the buffering layer 3 and the slope body filling soil 2, and a waterproofing and reinforcing layer 4 is arranged on the slope top 203.

There is the protection slope 202 for protecting the slope body filling soil 2 surrounding the tank body. However, if there is no protection structure on the slope top 203, the overall slope body will be affected, and therefore, the top of the slope body is provided with the waterproofing and reinforcing layer 4 by which rainwater permeation from top to bottom can be effectively avoided, and the protection slope 202 and the waterproofing and reinforcing layer 4 of the slope top 203 are combined to form a more integral and comprehensive slope body protection cover.

Further, the waterproofing and reinforcing layer 4 includes a square brick slope surface 401 and an impermeable membrane 402, the impermeable membrane 402 is arranged on the slope top 203, the square brick slope surface 401 is arranged outside the impermeable membrane 402, and the side, close to the vertical tank body 5, of the square brick slope surface 401 is relatively high, so that the square brick slope surface 401 is arranged obliquely towards the side slope surface 201 from the vertical tank body 5.

Firstly, the slope top 203 is provided with the impermeable membrane 402 by which rainwater permeation can be avoided; and the square brick slope surface 401 is further arranged outside the impermeable membrane 402, the square brick slope surface 401 can shield a part of rainwater, and the square brick slope surface 401 is arranged obliquely towards the side slope surface 201 from the vertical tank body 5 so as to be good in drainage effect. Secondly, the square brick slope surface 401 can also provide protection for the impermeable membrane 402, thereby delaying the shortening, caused by sunshine and wind, of service life of the impermeable membrane 402.

The technical solutions to be protected in the present disclosure are not limited to the above-mentioned embodiments. It should be indicated that combinations of the technical solution in any one of the embodiments and technical solutions in one or more of other embodiments fall within the protection scope of the present disclosure. Although the present disclosure has been described in detail with generalized descriptions and specific embodiments as above, some modifications or improvements may be made on the basis of the present disclosure, which is apparent for the skilled in the art. Therefore, all of these modifications or improvements made without departing from the spirit of the present disclosure fall within the scope claimed to be protected in the present disclosure.

What is claimed:

1. A fully soil-covered structure of a vertical tank body, which is arranged outside the vertical tank body, wherein the fully soil-covered structure comprises:
    a base layer, the base layer being arranged at a peripheral side of the vertical tank body and comprising a base material located on a ground floor, and a first filling gap being formed between a side, close to the vertical tank body, of the base layer and an outer wall of the vertical tank body; and
    a slope body filling soil, the slope body filling soil being arranged on the base layer, a second filling gap being formed between an inner side, close to the vertical tank body, of the slope body filling soil and the outer wall of the vertical tank body, and a side slope surface being formed on the outer side of the slope body filling soil;
    a buffering layer, the buffering layer filling the first filling gap and the second filling gap, the buffering layer comprising a buffering material filling the first filling gap and the second filling gap to wrap an outer surface of the vertical tank body, and the buffering layer having higher energy absorption efficiency than the slope body filling soil and being used for buffering a stress change between the vertical tank body and the slope body filling soil; and
    a size of the second filling gap in the radial direction of the vertical tank body is set to be gradually increased from bottom to top, so that an inverted circular truncated cone form is formed on the outer surface of the buffering layer corresponding to the second filling gap; an outer surface of the buffering layer in the inverted circular truncated cone form is provided with a generatrix, and an included angle of the generatrix relative to the vertical direction is not greater than 30°.

2. The fully soil-covered structure of the vertical tank body of claim 1, wherein the base material has a first compaction coefficient, the slope body filling soil has a second compaction coefficient, the buffering material has a third compaction coefficient, and the first compaction coefficient is greater than the second compaction coefficient, and the second compaction coefficient is greater than the third compaction coefficient.

3. The fully soil-covered structure of the vertical tank body of claim 2, wherein the base material of the base layer has a first particle size, the slope body filling soil has a second particle size, the buffering material of the buffering layer has a third particle size, and the first particle size is greater than the second particle size, and the second particle size is greater than the third particle size.

4. The fully soil-covered structure of the vertical tank body of claim 3, wherein the base material of the base layer is set to be graded broken stone, and the buffering material of the buffering layer is set to be silty-fine sand.

5. The fully soil-covered structure of the vertical tank body of claim 4, wherein a minimum thickness of the buffering layer in the radial direction of the vertical tank body is not smaller than 0.5 m.

6. The fully soil-covered structure of the vertical tank body of claim 3, wherein the first compaction coefficient is not smaller than 0.96, the second compaction coefficient is not smaller than 0.94, and the third compaction coefficient is not smaller than 0.9.

7. The fully soil-covered structure of the vertical tank body of claim 2, wherein the first compaction coefficient is not smaller than 0.96, the second compaction coefficient is not smaller than 0.94, and the third compaction coefficient is not smaller than 0.9.

8. The fully soil-covered structure of the vertical tank body of claim 2, wherein a minimum thickness of the buffering layer in the radial direction of the vertical tank body is not smaller than 0.5 m.

9. The fully soil-covered structure of the vertical tank body of claim 1, wherein an inner wall of the base layer corresponding to the first filling gap and an inner wall of the slope body filling soil are arranged to be extendable correspondingly, so that the first filling gap and the second filling gap correspond to each other, and the buffering layer in the inverted circular truncated cone form formed in the second filling gap is extendable to the first filling gap.

10. The fully soil-covered structure of the vertical tank body of claim 9, wherein a side slope surface formed on the outer side of the slope body filling soil enables the overall slope body filling soil to have a first pressure facing the buffering layer and the buffering layer in the inverted circular truncated cone form forms a downward second pressure, the second pressure is lower than the first pressure, and the second pressure is used for counteracting part of the first pressure acting on the vertical tank body.

11. The fully soil-covered structure of the vertical tank body of claim 1, wherein a side slope surface formed on the outer side of the slope body filling soil enables the overall slope body filling soil to have a first pressure facing the buffering layer and the buffering layer in the inverted circular truncated cone form forms a downward second pressure, the second pressure is lower than the first pressure, and the second pressure is used for counteracting part of the first pressure acting on the vertical tank body.

* * * * *